Patented Feb. 19, 1952

2,586,550

UNITED STATES PATENT OFFICE 2,586,550

HALOGEN-SUBSTITUTED ACETYL PEROXIDE CATALYST FOR HALO-OLEFIN POLYMERIZATION

William T. Miller, Ithaca, and Albert L. Dittman, Schenectady, N. Y., and Sherman K. Reed, Lewisburg, Pa., assignors to the United States of America as represented by the United States Atomic Energy Commission No Drawing. Application September 10, 1947, Serial No. 773,292

15 Claims. (Cl. 260—92.1)

This invention relates to a method of polymerizing polymerizable compounds and more particularly the invention relates to a process for the polymerization of completely halogenated olefinic monomers to yield products containing substantially no hydrogen or other reactive groups.

Olefinic compounds are polymerizable in the presence of chemical promoters which aid in initiating and maintaining the polymerization reaction. Such promoters as organic peroxides, e. g., acetyl peroxide, benzoyl peroxide and the like, have been used to promote these polymerization reactions.

This type of peroxide-promoted polymerization has been used to polymerize perhalogenated olefins such as trifluorochloroethylene and tetrafluoroethylene in order to produce materials with a high degree of chemical and thermal stability. When such compounds are polymerized in the presence of such organic promoters as benzoyl or other peroxides containing a relatively high percentage of hydrogen it often occurs that fragments of the promoter are added onto the polymeric chains. This results in one of the principal difficulties in this method of polymerization where a highly stable product is desired since the presence of even a small percentage of the hydrogen-containing promoter in the polymer may result in a marked reduction in the corrosion resistance of the polymer.

Accordingly, it is an object of this invention to provide an improved method for the polymerization of perhalogenated olefins.

It is another object of the invention to provide a method of preparing a high molecular weight polymer containing substantially no reactive material by polymerizing a completely halogenated olefin in the presence of a promoter.

It is still another object of the invention to increase the chemical and thermal stability of polymers of completely halogenated olefins.

Other objects of the invention will become apparent during the following description of the invention.

The present invention accomplishes the foregoing objects by polymerizing completely halogenated olefins in the presence of a halogen-substituted acetyl peroxide. Thus, when a fragment of the promoter combines with the polymer or is otherwise included in the polymerization product, the amount of hydrogen or other reactive groups contributed by the promoter is substantially reduced while the inertness of the polymerization products is enhanced to a marked degree. The use of the halogen-substituted acetyl peroxides contributes also to the speed and efficiency of the polymerization reaction. For maximum chemical inertness it is preferred to employ completely halogenated acetyl peroxides since these per se contribute no hydrogen to the polymer molecule. Trichloroacetyl peroxide is referred to in an article by Vanio and Uhlfelder, Berichte, 33, 1043 (1900).

It has been found that the polymerization of completely halogenated olefins is particularly favored by relatively low temperatures for the production of relatively high molecular weight polymers. Hence, considerable advantage is to be gained through the use of peroxides which require a relatively low temperature in order to regulate the decomposition of the peroxides so as to maintain a reasonable rate of decomposition. Thus, for example, the polymerization of trifluorochloroethylene at a temperature of the order of 0° C. in the presence of trichloroacetyl peroxide produces a very high molecular weight product containing substantially no hydrogen. However, although it is preferred to use such relatively low temperatures as 10° C. and less, the method of this invention is not limited to a specific temperature of reaction since this will depend, in general, upon the properties of the compounds employed.

It has been found that pressure aids the polymerization of these olefins. However, since the vapor pressure of the olefinic monomer is relatively low at the temperatures employed in accordance with this method, the application of external pressure has often been found to be advantageous.

The following examples are presented to illustrate the method of the present invention. Although these embodiments are limited to polymerization in the presence of trichloroacetyl peroxide, it will be understood that the method will not be limited to the specific conditions and materials set forth therein.

Example 1

Trifluorochloroethylene, $C_2F_3Cl$, was polymerized for about 72 hours at 0° C. in a vessel containing 50 grams of the monomer and about 0.25 grams of trichloroacetyl peroxide. About 26 grams of a white spongy solid was obtained as the principal product. This material softened at about 250° C.

Example 2

In order to obtain a polymer of very high molecular weight, 1260 grams of trifluorochloroethylene was polymerized in the presence of 15 grams of trichloroacetyl peroxide at temperatures in the range of −17° C. to −20° C. for 28 hours. About 595 grams of a particularly tough polymer was obtained with extremely good mechanical properties. This material could be hot pressed, extruded, milled and rolled and drawn into fibers.

The following examples show the effects of the amount of promoter and the time of polymerization of the trifluorochloroethylene on the yield obtained from this reaction.

| Example No. | Percent Trichloroacetyl Peroxide | Polymerization Time, Hr. | Temperature | Average Percent Conv. |
|---|---|---|---|---|
| 3 | 0.03 | 88 | −17° to −20° C | 6.9 |
| 4 | 0.12 | 128 | −17° to −20° C | 39.3 |
| 5 | 0.65 | 120 | −17° to −20° C | 31.0 |
| 6 | 0.9 | 120 | −19° to −18.5° C | 37.0 |
| 7 | 0.7 | 120 | −19° to −18.5° C | 32.0 |
| 8 | 0.7 | 120 | −19° to −18° C | 32.0 |
| 9 | 0.7 | 144 | −18° to −19° C | 37.0 |
| 10 | 0.5 | 160 | −17° C | 60.0 |

Example 11

Two samples of trifluorochloroethylene weighing 193 and 183 grams were polymerized at −17° C. for 100 hours in the presence of 2.7 and 2.34 grams respectively of trichloroacetyl peroxide. The applied pressures lay in the range of from about 12,700 to about 14,700 pounds per square inch. The product of these reactions was a hard white solid, and about 75% of the starting material was converted to the polymer. Although the physical properties of this material were, in general, similar to those of the material produced at relatively low pressure the yield obtained was considerably higher. Indeed, yields as high as 93.6% of the initial starting material have been obtained with a softening point in the neighborhood of 300° C. and above, through the use of this technique.

Example 12

About 65.1 grams of vinyl chloride was polymerized in the presence of about 0.03% by weight of trichloroacetyl peroxide based on the monomer for 10 days at about −16° C. Approximately 65.5% of the monomer was converted to solid polymer.

The halogenated acetyl peroxides may also be used in the polymerization of halogenated olefins having a higher number of carbon atoms such as olefins containing up to 4 carbon atoms, e. g., hexafluorobutadiene-1,3.

The polymerization of completely halogenated olefins may be conducted at various temperatures which will depend to a large extent on the specific promoter employed. For bis-trichloroacetyl peroxide, it is preferred to use the range −25 to 10° C. However, particularly good results have been obtained in the range −20 to 0° C. Although, when pressure is employed to aid the polymerization, it is preferred to use relatively high pressures such as those disclosed in Example 11, pressures as low as 500 pounds per square inch may be used to obtain similar benefits with some monomers. The upper limit of the pressure applied is restricted only by the mechanical difficulties involved.

Although the method of the present invention is particularly directed toward the production of polymers of completely halogenated olefins in order to obtain a high degree of chemical and thermal stability, other halogenated olefins may be polymerized by this method as shown in Example 12. In the polymerization of olefins in accordance with the present method it is preferred to use lower molecular weight olefins since these have a higher activity and mobility. In order to obtain the highest degree of chemical and thermal stability it is preferred to employ completely halogenated monomers, especially those containing a substantial amount of fluorine.

In addition other halogenated acetyl peroxides may be used such as dichloroacetyl peroxide, trifluoroacetyl peroxide, difluoroacetyl peroxide, difluorochloroacetyl peroxide and others of a similar nature. The amount of promoter employed will depend to a large extent on the molecular weight desired. In general, a smaller amount of promoter leads to a high molecular weight product. To obtain a high molecular weight polymer of trifluorochloroethylene it is preferred to use between 0.03 and 1.5% of trichloroacetyl peroxide based on the weight of monomer. Other alternatives to these will be apparent to persons skilled in the art.

The products of the polymerization of completely halogenated olefins, particularly those containing a substantial amount of fluorine, have wide application as a result of their chemical and thermal stability. These polymers are highly resistant to oxidizing and reducing agents, virtually all mineral acids, corrosive halides and many other corrosive materials which ordinarily attack plastic polymers. Hence, they are particularly useful as packing for valves and pumps, as valve seats and diaphragms, as gaskets and in other applications where corrosive materials are being handled. Because of their thermal stability they are useful in many electrical applications where ordinary insulation would fail. Since the polymer of trifluorochloroethylene may be prepared in transparent form, it may be used in the fabrication of corrosion resistant laboratory apparatus such as sight glasses and observation windows, and as lenses in safety goggles.

Since many embodiments might be made of the present invention and since many changes might be made in the embodiment described, it is to be understood that the foregoing description is to be interpreted as illustrative only and not in a limiting sense.

We claim:

1. A method for preparing a solid high molecular weight polymer which comprises polymerizing a halogen-substituted olefin having 2 carbon atoms in the presence of a completely halogen-substituted acetyl peroxide at a sufficiently low temperature to regulate the decomposition of said peroxide and continuing the polymerization until a solid high molecular weight polymer is produced.

2. A method for preparing a solid high molecular weight polymer which comprises polymerizing a completely halogen-substituted olefin having 2 carbon atoms in the presence of a completely halogen-substituted acetyl peroxide at a sufficiently low temperature to regulate the decomposition of said peroxide and continuing the polymerization until a solid high molecular weight polymer is produced.

3. A method for preparing a solid high molecular weight polymer which comprises polymerizing a completely halogen-substituted olefin having 2 carbon atoms in the presence of trichloroacetyl peroxide at a sufficiently low temperature to regulate the decomposition of said peroxide and continuing the polymerization until a solid high molecular weight polymer is produced.

4. A method for preparing a high molecular weight polymer containing substantially no hydrogen which comprises polymerizing a completely halogen-substituted olefin having 2 carbon atoms in the presence of trichloroacetyl peroxide at a temperature in the range of −25 to 10° C. to cause a regulated decomposition of said peroxide.

5. A method for preparing a high molecular weight polymer containing substantially no hydrogen which comprises polymerizing a completely halogen-substituted olefin having 2 carbon atoms in the presence of trichloroacetyl peroxide at a temperature in the range of −25 to 10° C. at a pressure in excess of the vapor pressure of said olefin to cause a regulated decomposition of said peroxide.

6. A method for preparing a high molecular weight polymer containing substantially no hydrogen which comprises polymerizing a completely halogen-substituted olefin having 2 carbon atoms in the presence of trichloroacetyl peroxide at a temperature in the range of −20 to 0° C. at a pressure at least 500 pounds per square inch to cause a regulated decomposition of said peroxide.

7. A method for preparing a solid high molecular weight polymer which comprises polymerizing a fluorochloroolefin having 2 carbon atoms in the presence of a completely halogen-substituted acetyl peroxide at a sufficiently low temperature to regulate the decomposition of said peroxide and continuing the polymerization until a solid high molecular weight polymer is produced.

8. A method for preparing a solid high molecular weight polymer which comprises polymerizing an olefin having 2 carbon atoms and consisting of carbon, fluorine and chlorine in the presence of a completely halogen-substituted acetyl peroxide at a sufficiently low temperature to regulate the decomposition of said peroxide and continuing the polymerization until a solid high molecular weight polymer is produced.

9. A method for preparing a high molecular weight polymer containing substantially no hydrogen which comprises polymerizing trifluorochloroethylene in the presence of 0.03 to 1.5% of trichloroacetyl peroxide at a temperature in the range of −20 to 0° C. to cause a regulated decomposition of said peroxide.

10. A method for preparing a high molecular weight polymer containing substantially no hydrogen which comprises polymerizing trifluorochloroethylene in the presence of 0.03 to 1.5% of trichloroacetyl peroxide at a temperature in the range of −20 to 0° C. at a pressure in excess of the vapor pressure of said trifluorochloroethylene to cause a regulated decomposition of said peroxide.

11. A method for preparing a high molecular weight polymer containing substantially no hydrogen which comprises polymerizing trifluorochloroethylene in the presence of 0.03 to 1.5% of trichloroacetyl peroxide at a temperature in the range of −20 to 0° C. at a pressure of the order of 1000 atmospheres to cause a regulated decomposition of said peroxide.

12. A method for preparing a solid high molecular weight polymer which comprises polymerizing trifluorochloroethylene in the presence of a halogen-substituted acetyl peroxide at a sufficiently low temperature to regulate the decomposition of said peroxide and continuing the polymerization until a solid high molecular weight polymer is produced.

13. A method for preparing a solid high molecular weight polymer which comprises polymerizing trifluorochloroethylene in the presence of trichloroacetyl peroxide at a sufficiently low temperature to regulate the decomposition of said peroxide and continuing the polymerization until a solid high molecular weight polymer is produced.

14. The method for preparing a solid high molecular weight polymer which comprises polymerizing vinyl chloride in the presence of a completely halogen-substituted acetyl peroxide at a sufficiently low temperature to regulate the decomposition of said peroxide and continuing the polymerization until a solid high molecular weight polymer is produced.

15. A method for preparing a solid high molecular weight polymer which comprises polymerizing vinyl chloride in the presence of trichloroacetyl peroxide at a sufficiently low temperature to regulate the decomposition of said peroxide and continuing the polymerization until a solid high molecular weight polymer is produced.

WILLIAM T. MILLER.
ALBERT L. DITTMAN.
SHERMAN K. REED.

REFERENCES CITED

The following references are of record in the file of this patent:

UNITED STATES PATENTS

| Number | Name | Date |
|---|---|---|
| 2,230,654 | Plunkett | Feb. 4, 1941 |
| 2,414,769 | Rust | Jan. 21, 1947 |
| 2,531,134 | Kropa | Nov. 21, 1950 |

FOREIGN PATENTS

| Number | Country | Date |
|---|---|---|
| 369,725 | Great Britain | Mar. 31, 1932 |